June 14, 1927.

H. DE W. ELSE 1,632,123

REDUCTION GEAR TRANSMISSION

Filed April 2, 1924   2 Sheets-Sheet 1

WITNESSES:

INVENTOR
Harry D. Else.
BY
ATTORNEY

June 14, 1927.

H. DE W. ELSE 1,632,123

REDUCTION GEAR TRANSMISSION

Filed April 2, 1924      2 Sheets-Sheet 2

WITNESSES:

INVENTOR
Harry D. Else.
BY
ATTORNEY

Patented June 14, 1927.

1,632,123

UNITED STATES PATENT OFFICE.

HARRY DE WITT ELSE, OF WILKINSBURG, PENNSYLVANIA, ASSIGNOR TO WESTINGHOUSE ELECTRIC & MANUFACTURING COMPANY, A CORPORATION OF PENNSYLVANIA.

REDUCTION-GEAR TRANSMISSION.

Application filed April 2, 1924. Serial No. 703,675.

My invention relates to reduction gear units, more particularly to a speed change mechanism embodied in a casing or housing as a unitary drive member, which is applicable to drive mechanism in which it is desirable to change the speeds of two rotating members in axial alinement.

It is among the objects of my invention to provide a reduction gear unit which is of simple, compact and durable mechanical construction and which shall lend itself readily and economically to manufacture in production quantities.

It is another object of my invention to provide a reduction gear mechanism of the planetary type in which the gear members shall be securely and rotatably mounted to operate efficiently to change the relative speeds of a pair of shaft members and which shall be free from vibrational and other detrimental forces.

It is a further object of my invention to provide a gear reduction unit in which the housing member shall be designed to provide for the gear elements a dust and leak proof chamber which constitutes a lubricating chamber that shall at all times provide adequate lubrication for the rotating parts.

The common form of planetary gearing comprises a pinion member and an internal gear wheel together with a plurality of planetary gears which co-operate with the pinion and gear wheel. The rotation of the planetary gear wheels within the internal gear member effects a speed reduction which adapts this form of gearing to applications where excessive bulk of structure is an objection as an unnecessary incumbrance. There have been proposed hitherto many forms of planetary change gear structures that are specifically applicable to certain operating conditions for which the several parts and elements constituting the change gear unit are specifically designed in accordance with the power, speed, or other operating conditions to which it is subjected.

My present invention is directed to a speed change mechanism, the design of which is readily adapted as a power unit or high-speed changing device, the apparatus being designed to comprise a minimum number of parts which shall provide a relatively wide range of speed reductions with but slight modifications.

Figure 1:
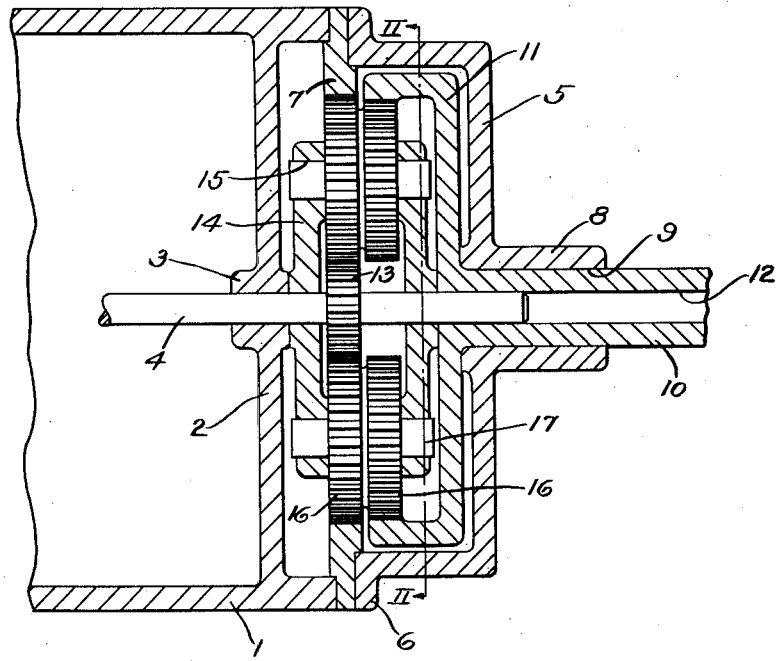
Figure 2:
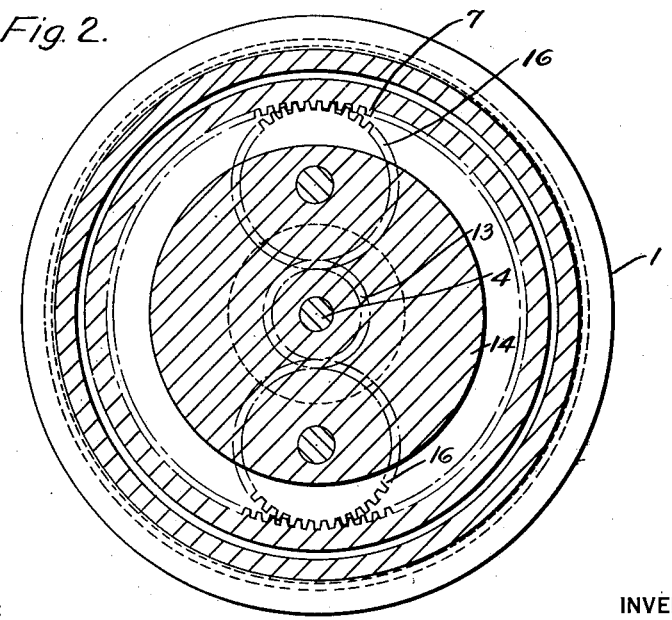
Figure 3:
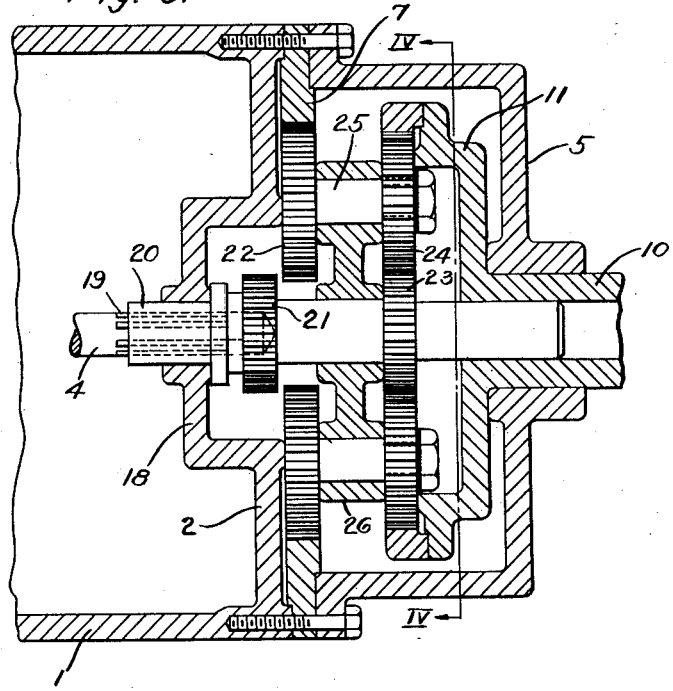
Figure 4:
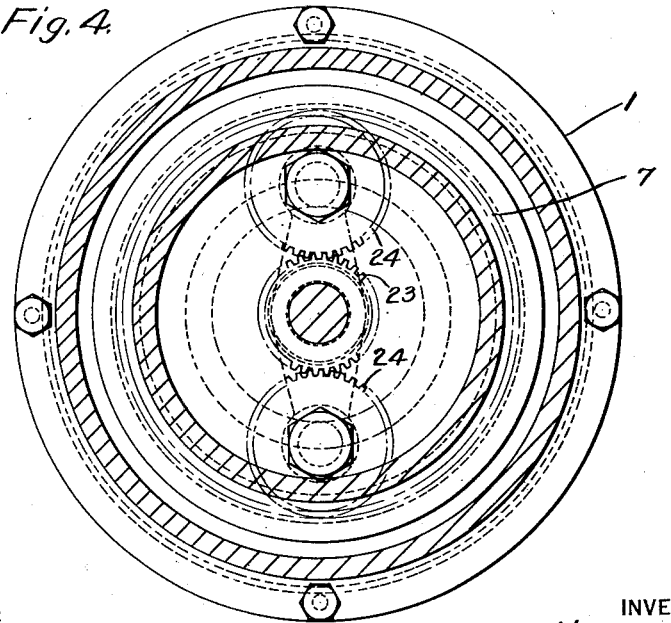

In the accompanying drawings constituting a part hereof and in which like reference characters designate like parts, Figure 1 is a view, partially in section and partially in elevation, of a gear reduction unit embodying the principles of my invention, Fig. 2 is a cross-sectional view thereof taken along the line II—II of Fig. 1, Fig. 3 is a view, partially in section and partially in elevation, of a modified form of my invention, and Fig. 4 is a cross-sectional view thereof taken along the lines IV—IV of Fig. 3.

Referring to Fig. 1, the device therein illustrated comprises a frame 1, which may constitute a part of a motor frame or other drive unit, having a web portion 2 provided with a hub or boss 3 for rotatably journalling a drive shaft 4. An end casing 5 having a flanged face 6 is secured to the frame 1 in any suitable manner and a ring gear 7 having internal teeth is disposed and rigidly secured between the frame 1 and the end casing 5.

The end casing 5 is provided with an elongated sleeve portion 8 having a central opening 9 adapted to receive the extension sleeve 10 of an internal sleeve gear 11, the sleeve 10 constituting a shaft which may be coupled to a driven member. The sleeve gear member 10 is provided with a central opening 12 to receive the end of the shaft 4 and to permit relative movement between the shaft 4 and sleeve 10.

The shaft 4 is provided with a gear wheel 13 which is secured thereto, and a pair of spiders 14, the latter having openings 15 and being adapted to rotate on the shaft 4. A plurality of planetary gear wheels 16, each constituting an integral pair of toothed rim members having a stud or shaft member 17, are journalled for rotation in the spiders 14. The wheels 16 are adapted to mesh with the gear wheel 13 secured to the drive shaft 4, and the teeth of the internal ring gear 7 and the member 11.

The toothed rims of the gear wheels 16 in engagement with the stationary ring gear 7 are provided with a greater number of teeth than the rims meshing with the teeth of the internal gear wheel 11 to effect a suitable speed reduction. Another manner of providing speed differentiation between the drive and driven shaft is to utilize straight cut spur gears for the wheels 16 and the shifting pitch line tooth principle for the internal wheel 11, so that the ratio of the internal wheel 11 to the gear wheels 16 differs from the ratio of the internal wheel 7 and the wheels 16.

In Fig. 3, I have illustrated a gear unit of slightly modified form in which one of the gear members is slidably mounted on the drive shaft for the purpose of obtaining a greater reduction of speed under operating conditions where a change of speed is desirable. The frame construction 1 is similar to that shown in Fig. 1 with the exception of an offset portion 18 which provides greater space in the end chamber between the web 2 and the end casing 5. The shaft 4 is provided with a plurality of spline keys 19 which are adapted to engage correspondingly shaped slots of a sleeve member 20 on which the gear wheel 21 is secured, to adapt the latter to be engaged or disengaged with the gear wheels 22.

The planetary gear structure is mounted on a single spider 26 which is rotatably mounted on the sleeve 20 and the gear wheel 23 is secured in spaced relation to the gear wheel 21 on the sleeve 20 to engage the gear wheels 24 which are secured to the studs or shafts 25 on which the gear wheels 22 are mounted. An internal gear wheel 11 having a hollow shaft 10 similar to that of Fig. 1, is journalled in the end casing 5 in co-operative alinement with the planetary gear wheels 24. The operation of these devices are briefly as follows: Referring to the mechanism shown in Fig. 1, a prime mover, such as a motor, is coupled to the shaft 4 which is the high speed member and rotation of the motor shaft actuates the planetary gear wheels 16 through the gear wheel 13 causing the former to revolve about the axis of the shaft 4 by virtue of their tooth engagement with the stationary ring gear 7. The rotary movement of the planetary gears, the toothed peripheries of which are of different diameters and tooth ratios, and the engagement with the internal gear wheel 11 produces a slow rotating movement of the hollow shaft 10 because of the differentiation in the rotation of the gear wheels. The speed ratios vary with changes in the diameters of the internal gear wheels 7 and 11, and of the toothed peripheries of the planetary gears 16.

It will be seen that this design is capable of variation to obtain a relatively great range of speed between the shaft 4 and the sleeve 10 and the compactness and durability of the structure produce a reduction gear unit which is efficient in its operation and allows adequate lubrication for the rotating parts. The space between the web 2 and the end bracket 5 constitutes a lubricating chamber which may be packed with grease or other suitable lubricant.

The device may be utilized as a speed reduction unit or it may be used for stepping up the speed of the driving member by attaching the latter to the low speed shaft. It is also evident that the casing 1 to which the internal gear wheel 7 is secured may be adapted for rotation to utilize the casing 1 as a feed roll or mangle roll.

In the operation of the device illustrated in Fig. 3, the planetary gears may be actuated through either of the gear wheels 21 or 23 and to produce changes in speed of the sleeve 10 corresponding to the ratios of the meshing gear wheels. The sleeve 20 may be moved axially on the shaft 4 with which it is engaged to engage either set of gear wheels but the gears 21 and 23 are so spaced on the sleeve 20 that one or the other may be engaged without possible interference of the disengaged member.

It is evident from the foregoing description of my invention that reduction gear units made in accordance with the principles herein set forth constitute efficient, durable and relatively inexpensive devices which are applicable to a variety of uses where it is desirable to effect a speed reduction between a pair of relatively movable shaft members which are preferably maintained in axial alinement.

Although I have described a specific embodiment of my invention, it will be obvious to those skilled in the art that various modifications may be made in the details of construction, such as the size and proportion of the several co-operating parts without departing from the principles herein set forth.

I claim as my invention:—

1. A speed-changing device, comprising a casing member, a sleeve gear journalled therein, a shaft extending into said sleeve gear and having a running fit therewith mounted for rotation in said casing, a pair of gear wheels mounted in spaced relation on said shaft, an internal gear securely mounted in said casing, a spider journalled on said shaft, planetary gear-wheels journalled on said spider and adapted to engage the sleeve gear and said internal gear, and means for engaging each of said pair of gear wheels with said planetary gear-wheels.

2. A speed-changing device, comprising a casing member, a sleeve gear journalled therein, a shaft extending into said sleeve gear and having a running fit therewith mounted for rotation in said casing, a spider journalled on said shaft, planetary gear-wheels journalled on said spider and in engagement with the sleeve gear, a pair of gear wheels mounted in spaced relation on said shaft, an internal gear securely mounted in said casing in engagement with the planetary gears and means for alternately engaging each of said pair of gear wheels with said planetary gear-wheels.

3. A speed-changing device, comprising a casing member, a sleeve gear journalled therein, a spline shaft extending into said sleeve gear and having a running fit therewith mounted for rotation in said casing, a spider journalled on said shaft, a pair of gear wheels mounted in spaced relation on said shaft, an internal gear securely mounted in said casing, planetary gear-wheels journalled on said spider and in engagement with said sleeve gear and internal gear and means for effecting axial movement of said spline shaft to engage one of said pair of gear wheels with said planetary gear-wheels.

4. A speed-changing device, comprising a casing member, a sleeve gear journalled therein, a spline shaft extending into said sleeve gear and having a running fit therewith mounted for rotation in said casing, a spider journalled on said spline shaft having a plurality of studs rotatably mounted therein with gear wheels of different tooth ratios secured to the respective ends thereof, a pair of gear wheels adapted to engage said planetary gears mounted in spaced relation on said shaft, an internal gear secured to said casing, and means for effecting axial movement of said spline shaft to engage said pair of gears with said planetary gears, said planetary gears being in co-operative engagement with said internal and sleeve gear members.

5. A speed changing device comprising a casing member, a high-speed and a low-speed shaft in axial alignment, two internal gears in spaced relation and respectively attached to the low-speed shaft and to the casing, a plurality of toothed planetary members selectively operatively connected to the high-speed shaft member and constrained to revolve about the principal axis at the same time rotating about their own axes, said planetary members being at all times in toothed engagement with each of the internal gear members, the planetary members and the internal gear members being of such proportions that the ratio of the one internal gear member to the planetary members differs from the ratio of the other internal gear member to the said planetary members.

6. A speed-changing device comprising a casing member, a high-speed and a low-speed shaft in axial alignment, a plurality of internal gears in spaced relation and respectively attached to the low-speed shaft and to the casing member, a plurality of pinions secured to the high-speed shaft member, a plurality of toothed planetary members which are normally in continuous toothed engagement with a pinion member and with each of the internal gear members, said planetary members being of such proportions that the ratio of the one internal gear member to the planetary member is different from the ratio of the other internal gear member to the said planetary member with which it engages, and means for effecting engagement of said pinions with one or the other of said planetary members.

7. A speed-changing device comprising a casing member, a high-speed and a low-speed shaft in axial alignment, a plurality of internal gears in spaced relation and respectively attached to the low-speed shaft and to the casing members, a plurality of toothed planetary members which are in continuous toothed engagement with each of the internal gear members, said planetary members being of such proportions that the ratio of the one internal gear member to the planetary member is different from the ratio of the other internal gear member to the planetary member with which it engages, and a plurality of pinion members mounted on the high-speed shaft and adapted to be selectively engaged with the planetary members, said pinions being of such proportions that the ratio of the one pinion member to the co-operating planetary member is different from the ratio of the other pinion to the planetary member with which it is adapted to engage.

In testimony whereof, I have hereunto subscribed my name this 24th day of March, 1924.

HARRY DE WITT ELSE.